(12) United States Patent
Royle (10) Patent No.: US 7,969,137 B2
(45) Date of Patent: Jun. 28, 2011

(54) SYSTEM FOR AND METHOD OF DETECTING A BURIED CONDUCTOR

(75) Inventor: John Mark Royle, Exeter (GB)

(73) Assignee: Radiodetection Limited, Bristol (GB)

( * ) Notice: Subject to any disclaimer, the term of this patent is extended or adjusted under 35 U.S.C. 154(b) by 213 days.

(21) Appl. No.: 12/395,847

(22) Filed: Mar. 2, 2009

(65) Prior Publication Data

US 2010/0001713 A1 Jan. 7, 2010

(30) Foreign Application Priority Data

Feb. 29, 2008 (GB) .................................. 0803875.4

(51) Int. Cl.
*G01R 19/00* (2006.01)
*G01V 3/11* (2006.01)
(52) U.S. Cl. .......................................... 324/67; 324/329
(58) Field of Classification Search .................. 324/67, 324/260, 207.25, 241, 239, 228, 326; 702/38
See application file for complete search history.

(56) References Cited

U.S. PATENT DOCUMENTS

| | | | |
|---|---|---|---|
| 4,348,639 A | 9/1982 | Karbowski | |
| 5,210,497 A * | 5/1993 | Regini | 324/520 |
| 5,471,143 A * | 11/1995 | Doany | 324/326 |
| 6,356,082 B1 | 3/2002 | Alkire et al. | |
| 7,091,872 B1 | 8/2006 | Bigelow et al. | |
| 7,285,958 B2 * | 10/2007 | Overby et al. | 324/326 |
| 2003/0001576 A1* | 1/2003 | Doany et al. | 324/326 |
| 2004/0183537 A1* | 9/2004 | Kelley | 324/326 |
| 2005/0248333 A1* | 11/2005 | Schlapp et al. | 324/67 |
| 2006/0036376 A1* | 2/2006 | Gudmundsson et al. | 702/38 |
| 2006/0238199 A1 | 10/2006 | Larsen | |
| 2007/0170908 A1 | 7/2007 | Mercer et al. | |

FOREIGN PATENT DOCUMENTS

| | | |
|---|---|---|
| GB | 2211621 A | 7/1989 |
| GB | 2245370 A | 1/1992 |
| JP | 2002189083 A | 7/2002 |
| WO | 2005015263 A1 | 2/2005 |

* cited by examiner

*Primary Examiner* — Melissa J Koval
*Assistant Examiner* — Temilade Rhodes-Vivour
(74) *Attorney, Agent, or Firm* — Baker & Hostetler LLP (57) ABSTRACT

A system for detecting a buried conductor comprises a transmitter for producing an alternating test current in the buried conductor and a receiver for detecting an electromagnetic field produced by the test current in the buried conductor. A communication link is provided between the receiver and the transmitter. The test current comprises first and second components of different frequency. The receiver monitors the phase creepage of the first and second components and controls the transmitter to reset the phase difference between the first and second components as phase creepage increases.

23 Claims, 4 Drawing Sheets

SYSTEM FOR AND METHOD OF DETECTING A BURIED CONDUCTOR

CROSS REFERENCE TO RELATED APPLICATIONS

This application claims priority to United Kingdom Patent Application GB 0803875.4, filed on Feb. 29, 2008, and entitled "System for and Method of Detecting a Buried Conductor," the disclosure of which is incorporated herein by reference in its entirety.

FIELD OF THE INVENTION

The present invention relates to a system for and method of detecting a buried conductor.

BACKGROUND OF THE INVENTION

Before commencing excavation or other work where electrical cables, fibre optic cables or other utilities ducts or pipes are buried, it is important to determine the location of such buried cables or pipes to ensure that they are not damaged during the work. Once a buried utility is located the depth of the utility can be calculated to determine a safe excavation depth.

Current carrying conductors emit electromagnetic radiation which can be detected by an electrical antenna. If fibre optic cables or non-metallic utilities ducts or pipes are fitted with a small electrical tracer line, an alternating electrical current can be induced in the tracer line which in turn radiates electromagnetic radiation. It is known to use detectors to detect the electromagnetic field emitted by conductors carrying alternating current.

One type of such detector works in one of two modes, namely 'active' or 'passive' modes. Each mode has its own frequency bands of detection.

The passive mode comprises 'power' mode and 'radio' mode. In power mode, the detector detects the magnetic field produced by a conductor carrying an AC mains power supply at 50/60 Hz, or the magnetic field re-radiated from a conductor as a result of a nearby cable carrying AC power, together with higher harmonics up to about 5 KHz. In radio mode, the detector detects very low frequency (VLF) radio energy which is re-radiated by buried conductors. The source of the original VLF radio signals is a plurality of VLF long wave transmitters, both commercial and military.

In the active mode, a signal transmitter produces an alternating magnetic field of known frequency and modulation, which induces a current in a nearby buried conductor. The signal transmitter may be directly connected to the conductor or, where direct connection access is not possible, a signal transmitter may be placed near to the buried conductor and a signal may be induced in the conductor. The buried conductor re-radiates the signal produced by the signal transmitter.

A number of factors must be considered when using the active mode. As the transmitter is conventionally powered by on-board batteries it is important to efficiently generate the test signal whilst conserving the power expended by the transmitter as much as possible so as to prolong the battery life of the transmitter. Therefore the power of a detectable test signal emitted by the transmitter should be minimised to reduce battery consumption. In addition, a high power signal can couple to unwanted lines and spread over the lines, making it difficult to detect the target buried conductor.

The transmitter can be configured to transmit an alternating test signal at a number of frequencies. The choice of frequency depends on a number of factors, for example the ease of inducing the test signal into the buried conductor and interference from ambient signals.

Regarding the choice of frequency of the alternating test signal, a high frequency signal is used when the line impedance is high (typically if the ground is dry or when the target wire is an insulated twisted pair without a common ground reference), a medium frequency signal is typically used for mains power supply cables and continuous metal pipes and a low frequency signal is used for long distance tracing where a good earth return is provided at the cable end.

The frequency of an initially chosen test signal may not be suitable due to interference from ambient signals. Signals being carried by other nearby conductors at the same frequency or having a harmonic frequency the same as the frequency of the test signal may lead to a poor signal to noise ratio of the signal detected at the receiver. Interference due to such ambient frequencies may require altering the frequency of the test signal produced by the transmitter to avoid interference by the ambient frequencies.

Therefore, when using a transmitter to produce an alternating test current in the buried conductor the operator may be required to iteratively set the transmitter signal power and frequency so that the signal produced by the transmitter is of a suitable frequency to be detected by the receiver and of an efficient power. This requires the participation of a separate operator for the transmitter and receiver or the operator of the receiver to repeatedly travel between the transmitter and the target site where the receiver is located, which is time consuming.

When applying a test signal to a target buried conductor to be traced a difficulty can arise if there is a second buried conductor in close proximity to the target buried conductor. The field radiated by the target buried conductor carrying the test signal may induce a current in the second buried conductor due to capacitive coupling or direct bonding between the two buried conductors as the second conductor carries a ground return current. The induced current in the second conductor is then re-radiated by the second conductor and may be picked-up by the receiver. Therefore when tracing the route of a buried conductor it is necessary to verify that the conductor that is being traced is the target conductor and not a second buried conductor onto which the test signal is coupled from the target conductor.

U.S. Pat. No. 5,260,659, assigned to Radiodetection Limited on its face and the contents of which are incorporated herein by reference, describes a system for tracing a buried current carrying conductor. An alternating test signal having first and second components, related in frequency and phase, is applied to the target conductor and the electromagnetic field is detected at a plurality of positions. By considering the phase of the first and second components a decision can be made about whether the conductor being detected is the target conductor or a second conductor onto which the test signal has been buried.

SUMMARY OF THE INVENTION

Embodiments of the present invention advantageously provide a system for and method of detecting a buried conductor.

According to a first aspect of the invention there is provided a system for detecting a buried conductor, the system comprising: means for producing an alternating test current in said buried conductor, the test current comprising a first component and a second component having a frequency different to a frequency of the first component; means for detecting an electromagnetic field produced by the test current in said buried conductor and for measuring a phase difference between the first component and the second component; and means for providing a communication link between the means for detecting an electromagnetic field and the means for producing an alternating test current; wherein the means for detecting an electromagnetic field and the means for producing an alternating test current are configured for the means for detecting an electromagnetic field to alter, via the communication link, the phase difference between the first component and the second component.

The means for producing an alternating test current and the means for detecting an electromagnetic field may be configured for the means for detecting an electromagnetic field to alter the phase difference between the first component and the second component by: the means for detecting an electromagnetic field being configured to compare the phase difference between the first component and the second component to a reference phase difference and to calculate a phase creepage; the means for detecting an electromagnetic field being configured to transmit a command to the means for producing an alternating test current to alter the phase difference between the first component and second component when the phase creepage is above a lower threshold and below an upper threshold; and the means for producing an alternating test current being configured to receive the command transmitted from the means for detecting an electromagnetic field and to alter the phase difference between the first component and the second component.

The means for detecting an electromagnetic field may comprise a user interface and the means for detecting an electromagnetic field may be configured to convey a warning when the phase creepage is above the upper threshold.

The warning may comprise a warning that the phase of one of the first component and the second component is reversed or that the electromagnetic field detected by the means for detecting an electromagnetic field is not produced by the test current in said buried conductor.

The lower threshold may be 5 degrees, preferably 3 degrees and preferably 2 degrees.

The upper threshold may be 60 degrees, preferably 80 degrees and preferably 88 degrees.

The reference phase difference may be measured at a location along said buried conductor.

The communication link between the means for detecting an electromagnetic field and the means for producing an alternating test current may be provided by a transceiver at each of the means for producing an alternating test current and means for detecting an electromagnetic field.

The communication link may be a duplex or half-duplex wireless or wired communication link. The wireless communication link may use the Bluetooth communication protocol.

The means for detecting an electromagnetic field may be configured to alter the phase difference between the first component and the second component without intervention from an operator of the system.

The test current in said buried conductor may be produced by the means for producing an alternating test current by means of an output module, the output module either radiating an electromagnetic field to induce the test current in said buried conductor, being directly connected to a part of said buried conductor or clamping the output module around said buried conductor.

The means for detecting an electromagnetic field may comprise a plurality of antennas for detecting the electromagnetic field produced by the test current in said buried conductor, wherein each antenna outputs a field strength signal representative of the electromagnetic field at the antenna.

The system may further comprise amplifiers arranged to amplify the field strength signals.

The system may further comprise: analogue to digital converters to convert the field strength signals into digital signals; and a digital signal processor arranged to process the digital signals and to isolate signals of predetermined frequency bands.

According to a second aspect of the invention there is provided a method of detecting a buried conductor, the method comprising: providing a transmitter for producing an alternating test current in said buried conductor, the test current comprising a first component and a second component having a frequency different to a frequency of the first component; providing a receiver for detecting an electromagnetic field produced by the test current in said buried conductor and for measuring a phase difference at the receiver between the first component and the second component; providing a communication link between the receiver and the transmitter; and the receiver altering, via the communication link between the receiver and the transmitter, the phase difference between the first component and the second component.

The receiver may alter the phase difference between the first component and the second component by: comparing the phase difference at the receiver between the first component and the second component to a reference phase difference to calculate a phase creepage; comparing the phase creepage to a lower threshold and an upper threshold; transmitting a command from the receiver to the transmitter to alter the phase difference between the first component and second component when the phase creepage is above the lower threshold and below the upper threshold; and altering the phase difference at the transmitter between the first component and the second component.

The receiver may comprise a user interface and a warning may be conveyed at the receiver when the phase creepage is above the upper threshold. The warning may comprise a warning that the phase of one of the first component and the second component is reversed or that the electromagnetic field detected by the receiver is not produced by the test current in said buried conductor.

The lower threshold may be 5 degrees, preferably 3 degrees and preferably 2 degrees.

The upper threshold may be 60 degrees, preferably 80 degrees and preferably 88 degrees.

The reference phase difference may be measured at a location along said buried conductor.

The communication link between the receiver and transmitter may be provided by a transceiver at each of the transmitter and receiver. The communication link between the receiver and transmitter may be a duplex or half-duplex wireless or wired communication link. The wireless communication link may use the Bluetooth communication protocol.

The receiver may be configured to alter the phase difference between the first component and the second component without intervention from an operator of the system.

The test current in said buried conductor may be produced by the transmitter by means of an output module, the output module either radiating an electromagnetic field to induce the test current in said buried conductor, being directly connected to a part of said buried conductor or clamping the output module around said buried conductor.

The receiver may comprise a plurality of antennas for detecting the electromagnetic field produced by the test current in said buried conductor.

Each antenna may output a field strength signal representative of the electromagnetic field at the antenna.

The method may further comprise amplifiers arranged to amplify the field strength signals and analogue to digital converters to convert the field strength signals into digital signals; and a digital signal processor arranged to process the digital signals and to isolate signals of predetermined frequency bands.

According to a further aspect of the invention there is provided a carrier medium carrying computer readable code for controlling a microprocessor to carry out the method described above.

According to a further aspect of the invention there is provided a system for detecting a buried conductor, the system comprising: a transmitter for producing an alternating test current in said buried conductor, the test current comprising a first component and a second component having a frequency different to a frequency of the first component; a receiver for detecting an electromagnetic field produced by the test current in said buried conductor and for measuring a phase difference at the receiver between the first component and the second component; and means for providing a communication link between the receiver and the transmitter; wherein the transmitter and receiver are configured for the receiver to alter, via the communication link between the receiver and the transmitter, the phase difference between the first component and the second component.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout.

Figure 1:
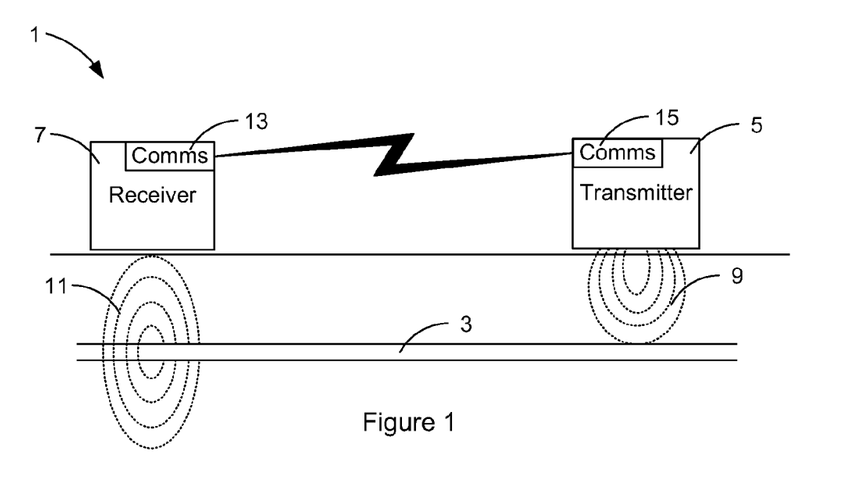
FIG. 1 is a schematic representation of a system for detecting a buried conductor according to an embodiment of the invention.

FIG. 1 is a schematic representation of a system 1 for detecting a buried conductor according to an embodiment of the invention, comprising a portable transmitter 5 and a portable receiver 7. The transmitter 5 is placed in proximity to a buried conductor 3 and acts as a means for producing an alternating current test signal in the buried conductor 3.

An aerial in the transmitter is fed with an AC voltage to produce a magnetic field 9 which links around the buried conductor 3, thereby inducing an alternating current test signal in the buried conductor 3. The alternating current test signal is radiated as a electromagnetic field 11 by the buried conductor 3 which can be detected by the receiver 7. Thus, the receiver 7 acts as a means for detecting the electromagnetic field 11 produced by the test current in said buried conductor 3.

Both the transmitter 5 and receiver 7 comprise a communications module 13, 15. Each communications module 13, 15 comprises a transceiver that provide a communication link between the receiver 7 and the transmitter 5. Control signals are transmitted using a wireless communications technique using the Bluetooth® standard. In other embodiments other wired or wireless techniques may be used to transmit control signals between the receiver 7 and the transmitter 5.

Figure 2:
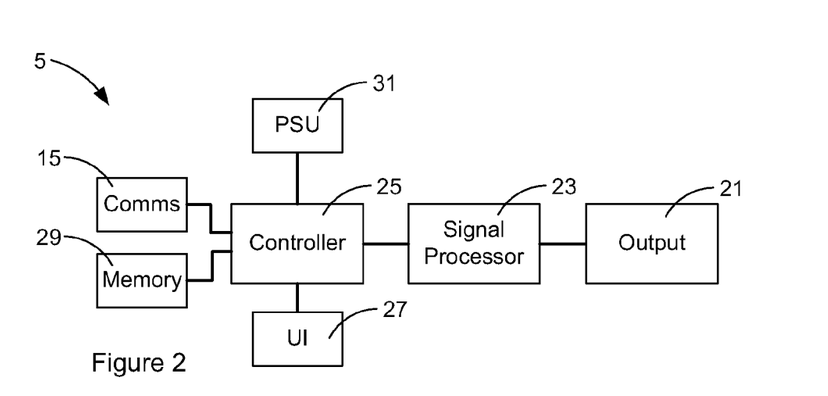
FIG. 2 is a block diagram of the transmitter of the system of FIG. 1.

FIG. 2 is a block diagram of the portable transmitter 5 of the system 1 of FIG. 1. The alternating current test signal is radiated by an output module 21 and coupled into the buried conductor 3 to produce the alternating test current in the buried conductor 3. In other embodiments where direct access to the conductor is available the transmitter signal may be applied to the buried conductor 3 by conventional techniques of directly connecting an output module 21 to the buried conductor 3 or by clamping the output module 21 around the buried conductor 3. The output module 21 may also flood an area with a signal which energises all conductor lines in the area.

The test signal produced by the output module 21 is controlled by a signal processor module 23. The signal processor module 23 sets the power, frequency and modulation scheme of the signal to be applied to the buried conductor 3. The signal processor module 23 and output module 21 are controlled by a controller 25. The operation of the transmitter 5 is set either by an operator via a user interface module 27 or by the commands received at the communications module 15 sent from the receiver 7, as described below.

The user interface module 27 conveys information to the operator of the transmitter 5 and may comprise one or more of a display for displaying information to the operator of the device, input devices such as a keypad or a touch sensitive screen and an audible output devices such as a speaker or beeper. In addition to the communications module 15 sending and receiving commands to/from the communications module 13 of the receiver 7, the communications module 15 also enables the transmitter 5 to be connected to a personal computer (PC) or a personal digital assistant (PDA) (not shown). The transmitter 5 further comprises a memory module 29 and a power supply unit (PSU) 31 comprising a power source such as batteries and power management circuitry.

The transmitter 5 comprises means for calculating the complex impedance of the ground at the transmitter 5. The complex impedance of the ground is measured by comparing the phase and magnitude of the voltage driving the output module 21 with the phase and magnitude of the current through the output module 21. The relationship between these phases depends on the nature of the load (the utility) to which the test signal is applied. If the load is dominantly resistive then the current and voltage will be substantially in phase. For a dominantly capacitive load the current will lead the voltage at a phase angle up to 90° and if the load is dominantly inductive then the current will lag the voltage by a phase angle up to 90°. The components of the portable transmitter 5 are housed in a housing (not shown).

Figure 3:
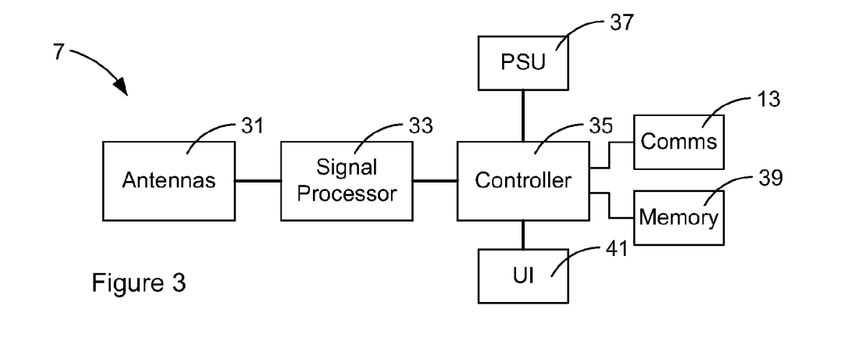
FIG. 3 is a block diagram of the receiver of the system of FIG. 1.

FIG. 3 is a block diagram of the portable receiver 7 of the system 1 of FIG. 1. An electromagnetic field 11 radiated by the buried conductor 3 is detected by antennas in an antenna module 31. Each antenna outputs a field strength signal representative of the electromagnetic field at the antenna. The outputs from the antenna module 31 are fed into a signal processor module 33 which comprises a signal processor module 33 for isolating signals of a desired frequency or frequencies and processes these signals to derive their characteristics. The signal processor module 33 comprises a pre-amplification stage for amplifying the field strength signals output from the antennas if the detected signal is weak. The signal processor module 33 further comprises an analogue to digital converter for converting the field strength signals into digital signals and a digital signal processor block for processing the digitised signals. Like the transmitter 5, the receiver 7 also comprises a controller 35, PSU 37, communications module 13, memory 39 and user interface 41. The components of the portable receiver 7 are housed in a housing (not shown).

The communications modules 13, 15 of the receiver 7 and transmitter 5 provide a communication/data link between the receiver 7 and transmitter 5 which enhances the locating experience of the operator of the system 1, simplifies the operator interface and facilitates single user operation of the transmitter 5 and receiver 7. In this embodiment the communication link is a radio frequency telemetry system providing half-duplex communication between the transmitter 5 and receiver 7. In other embodiments a full duplex communication link may be used.

By using a long range Bluetooth® transceiver, such as the Ezurio® BTM404 long range Bluetooth® Serial Modules, the communication link between the transmitter 5 and receiver 7 may be maintained up to a line of sight range of 800 m. This communication standard provides a good balance between the range of the communication link and low power consumption required from the batteries of the transmitter 5 and receiver 7 to maintain the communication link. Alternative communication standards may be used in other embodiments.

In this embodiment the receiver 7 takes full-authority control of the transmitter 5. The communication transport layer is based on a standard slip protocol suitable for asynchronous and synchronous serial data. The receiver 7 acts as the bus master and the transmitter 5 as a slave. All commands sent from the receiver 7 to the transmitter 5 are acknowledged by the transmitter 5 to allow the transmitter 5 and receiver 7 to be synchronised. In the event of a checksum error or an acknowledge signal not being received by the receiver 7 both receiver 7 and transmitter 5 assume the command to be inactive. It will be apparent to a person skilled in the art that any suitable communication protocol may be used for sending commands and responses between the receiver 7 and transmitter 5.

In a first embodiment of the system 1 receiver commands and transmitter responses are given in Table 1.

TABLE 1

Receiver Commands and Transmitter Responses

| Command |
| --- |
| Set Frequency |
| Set Power Demand |
| Set Voltage Demand |
| Set Current Demand |
| Increment/Decrement Frequency |
| Induction Mode ON/OFF |
| 8KFF ON/OFF |
| CD Waveform ON/OFF |
| ACD Waveform ON/OFF |
| Increment CD F1 Phase |

In a second embodiment the receiver 7 and transmitter 5 have an expanded command and response set as shown in Tables 2.

TABLE 2

Additional Receiver Commands and Transmitter Responses of the $2^{nd}$ embodiment

| Command |
| --- |
| Request Ground Impedance |
| Request Power Output |
| Request Voltage Output |
| Request Current Output |
| Request Battery Volts |

Figure 4:
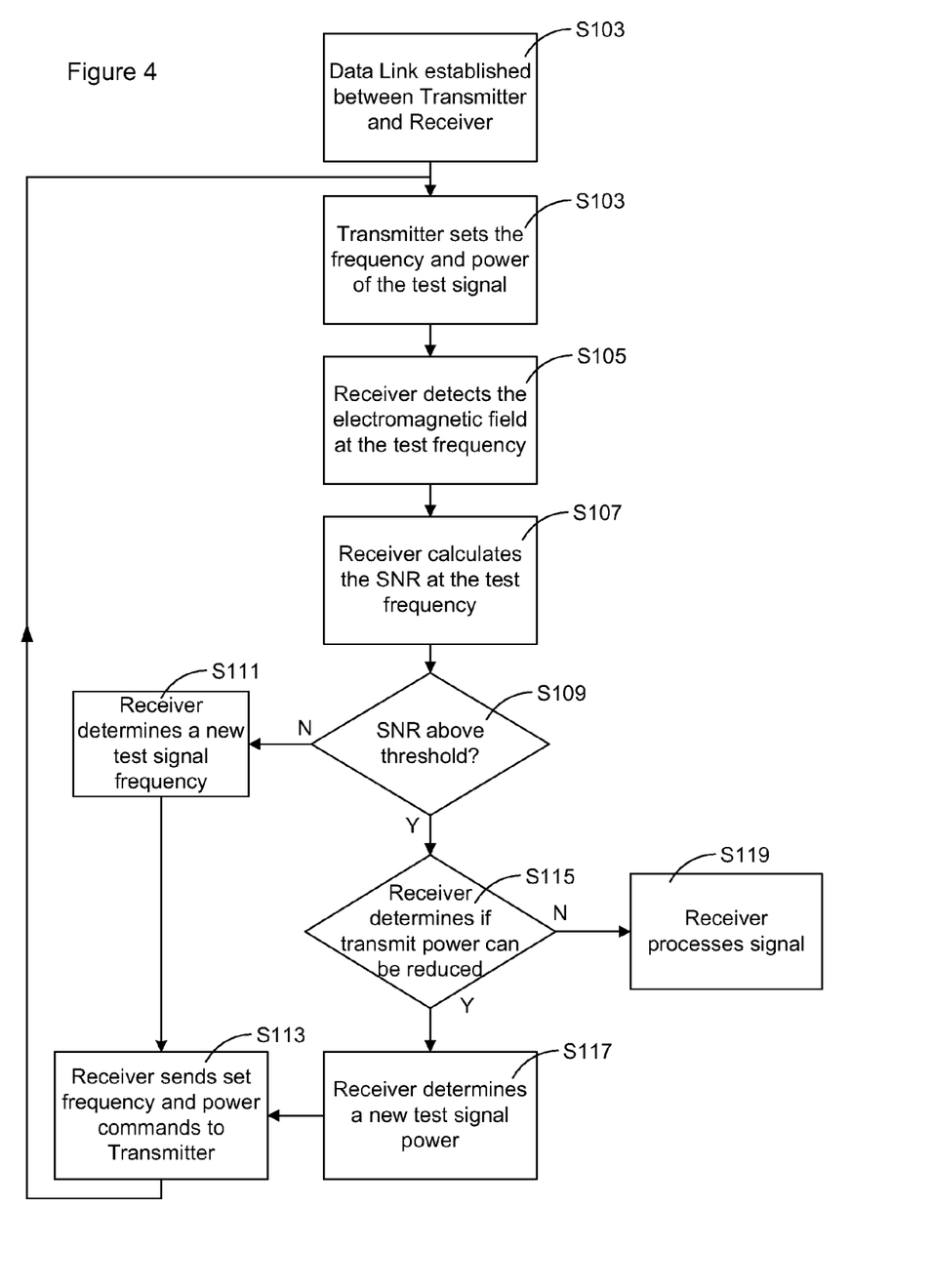
FIG. 4 is a flow chart of a method of setting the transmit power and frequency of the test signal produced by the transmitter using the system of FIG. 1 in a first embodiment of the invention.

In the first embodiment of the invention the system 1 of FIG. 1 is configured to remotely set characteristics of the test signal transmitted by the transmitter 5 according to the method shown in FIG. 4.

The transmitter 5 and receiver 7 are turned on and in step S101 the communication link between the transmitter 5 and receiver 7 is established. The characteristics of the test signal comprise its frequency and power and these are initially set at the transmitter 5 via its user interface 27 at step S103. The test signal is transmitted by the transmitter 5 and coupled to the buried conductor, either directly or indirectly to produce an alternating test current in the buried conductor 3. The frequency of the test signal is input to the receiver 7 so that the receiver 7 monitors signals at the frequency of the test signal produced by the transmitter 5. At step S105 the receiver 7 detects the electromagnetic field 11 radiated by the buried conductor at the test signal's frequency using known amplification, filtering and signal processing techniques.

At step S107 the receiver 7 calculates the signal to noise ratio (SNR) of the test signal at the test signal's frequency. The SNR of the test signal should be above a lower threshold level to be able to process the test signal and at step S109 the receiver 7 determines if the signal detected at the test signal's frequency is above the lower threshold level. If there is noise at the test signal's frequency, for example due to interference from ambient signals or harmonics thereof at the same frequency, then at step S111 the receiver 7 determines a new test signal frequency by nudging the frequency a small amount, for example by ±17 Hz. The decision to nudge the locate frequency may either be taken automatically by the receiver (based on an assessment of the SNR) or a manual operation at the request of the operator. At step S113 the receiver 7 sends a "Set Frequency" and a "Set Power Demand" command to the transmitter 5 which is acknowledged by the transmitter 5 by sending an acknowledge response to the receiver 7. The method then returns to step S103 and repeats steps S103 to S113 until the SNR of the test signal detected at the receiver 7 is above the lower threshold level.

The lower threshold level is at least 20 dB (10 Hz bandwidth), preferably at least 12 dB (10 Hz bandwidth) and further preferably at least 6 dB (10 Hz bandwidth).

Once the SNR is determined to be above the lower threshold level then at step S115 the receiver 7 determines if the SNR of a magnitude such that the transmit power of the test signal transmitted by the transmitter 5 can be reduced. An upper threshold level is at 40 dB (10 Hz bandwidth), preferably 50 dB (10 Hz bandwidth) and further preferably at least 60 dB (10 Hz bandwidth). Reducing the transmit power of the test signal reduces the power consumption of the transmitter 7, thereby enhancing the operating time of the PSU 29 of the transmitter 7 whilst still producing a test signal with an acceptable SNR at the receiver 7. If a lower SNR can be tolerated then at step S117 the receiver 7 determines a lower test signal power and at step S113 the receiver 7 sends a "Set Frequency" and a "Set Power Demand" command to the transmitter which is acknowledged by the transmitter 5 by sending an acknowledge response to the receiver 7. The method then returns to step S103 and repeats steps S103 to S117 until the SNR of the test signal detected at the receiver 7 is above the lower threshold level and the transmit power of the test signal is at an optimal level. Once these conditions are met then at step S119 the receiver processes the test signal to determine, for example, the depth of the buried conductor.

Figure 5:
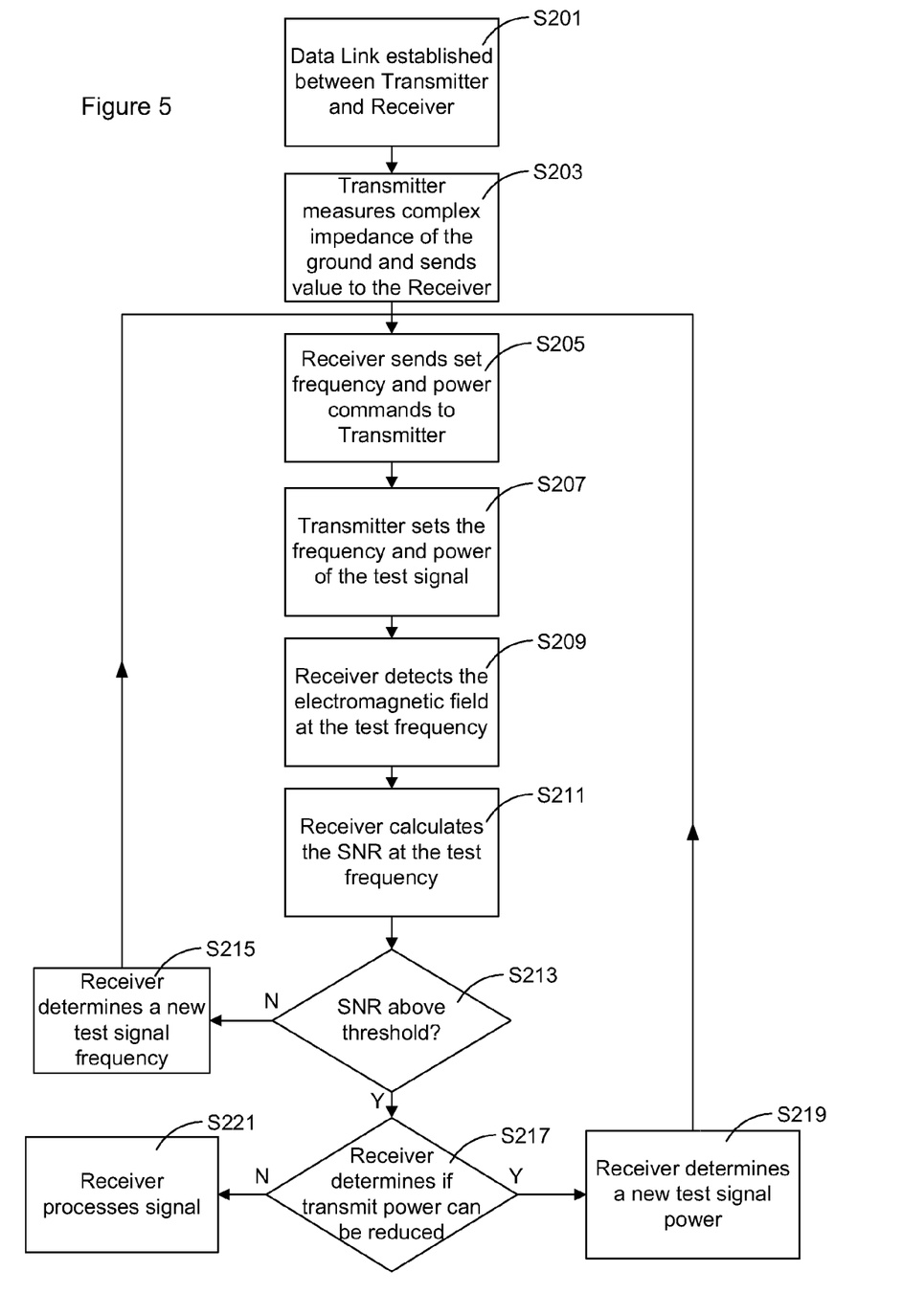
FIG. 5 is a flow chart of a method of setting the transmit power and frequency of the test signal produced by the transmitter using the system of FIG. 1 in a second embodiment of the invention.

In the second embodiment of the invention the system 1 of FIG. 1 is configured to remotely set properties of the test signal transmitted by the transmitter 5 according to the method shown in FIG. 5. As stated above with reference to Tables 3 and 4, in the second embodiment the receiver 7 and transmitter 5 have an expanded command and response set.

As for the first embodiment, in the second embodiment the transmitter 5 and receiver 7 are turned on and the communication link between the transmitter 5 and receiver 7 is established in step S201. At step S203 the transmitter 5 measures the complex impedance of the ground and sends this value to the receiver. In this embodiment this step is in response to the "Request Ground Impedance" command sent by the receiver 7 to the transmitter 5. In other embodiments the transmitter 6 may be configured to periodically measure and send the measurement of the ground's complex impedance to the receiver 5 or the transmitter may be configured to measure and send the measurement of the ground's complex impedance to the receiver 5 once the communication link between the transmitter 5 and receiver 7 are established.

The receiver 7 uses the complex impedance measurement received from the transmitter 5 to initially set the frequency of the transmitted test signal. If the load is determined to be of low resistance or dominantly inductive then a low frequency is initially set for the transmitter's test signal. If the load is of high resistance or dominantly capacitive then a high frequency is initially set for the transmitter's test signal.

At step S205 the receiver 7 sends a "Set Frequency" and a "Set Power Demand" command to the transmitter 5 which is acknowledged by the transmitter 5 by sending an acknowledge response to the receiver 7. The power and frequency of the test signal are set by the transmitter 5 in accordance with the command sent by the receiver 7 at step S207. The test signal is transmitted by the transmitter 5 and coupled to the buried conductor 3.

At step S209 the receiver 7 detects the electromagnetic signal 11 radiated by the buried conductor 3 and at step S211 the receiver 7 calculates the signal to noise ratio (SNR) of the test signal at the test signal's frequency as for the first embodiment. At step S213 the receiver 7 determines if the signal detected at the test signal's frequency is above the threshold level. If the SNR is below the threshold then at step S215 the receiver 7 determines a new test signal frequency by nudging the frequency by a small amount as described above. The method then returns to step S205 and repeats steps S205 to S215 until the SNR of the test signal detected at the receiver 7 is above the threshold level.

Once the SNR is determined to be above the threshold level then at step S217 the receiver 7 determines if the SNR is of a magnitude such that the transmit power of the test signal transmitted by the transmitter 5 can be reduced. If a lower SNR can be tolerated then at step S219 the receiver 7 determines a lower test signal power. The method then returns to step S205 and repeats steps S205 to S219 until the SNR of the test signal detected at the receiver 7 is above the threshold level and the transmit power of the test signal is at an optimal level. Once these conditions are met then at step S221 the receiver 7 processes the test signal to determine, for example, the depth of the buried conductor 3.

The techniques described in U.S. Pat. No. 5,260,659 are used in the present invention in combination with the communication link between the transmitter 5 and receiver 7 to enhance the detecting experience of the operator. In this embodiment one signal component $f_1$ is twice the frequency of the other signal component $f_2$. In other embodiments one signal component may be an even integer multiple or a subharmonic of the other.

If a test signal applied to a target conductor is coupled to a second proximal conductor then it is likely that this signal will be phase reversed with respect to the original signal. The coupling mechanism between adjacent conductors may be either resistive, capacitive or inductive. In the case of a resistive coupling there is still likely to be a phase shift as the signal will return to the transmitter on the path of least impedance. Therefore, with a knowledge of the phase $\phi_{f1}$, $\phi_{f2}$ of the components $f_1$, $f_2$ of the detected signal it is possible to discriminate between the outgoing 'original signal' and the unwanted secondary signal. This method is known as Current Direction Recognition.

At the receiver, doubling the lower frequency $f_2$ produces two signals $f_1$, $2f_2$ of the same frequency and having phase $\phi_{f1}$ and $2\phi_{f2}$. The quantity $\phi_{f1}-2\phi_{f2}$ acts as a phase invariant, that is to say it has one value for the original conductor signal and is 180° shifted for the signal on the adjacent utility. Therefore it is possible to determine unambiguously if the field being detected is radiated by the target conductor to which the test signal is applied or by another conductor. In this manner the receiver can act as a means for measuring the phase difference between a first component and a second component of the test signal.

By this method the phase of the two signals at the receiver may be compared to identify the conductor to which the test signal was applied and the conductor carrying the ground return current.

As the frequencies of the two frequency components $f_1$, $f_2$ are separated by a factor of two this has the disadvantage that the capacitive leakage current of the higher frequency component $f_1$ is at least twice that of the lower frequency component $f_2$. This causes the frequency components $f_1$, $f_2$ to experience a different rate of attenuation and phase shift along the conductor leading to creepage in the phase difference $\phi_{f1}-2\phi_{f2}$ between the frequency components $f_1$, $f_2$ generated at the receiver 7.

Therefore a phase reversal detected at discrete points along the length of the buried conductor may be due to either the test signal having 'jumped' onto a second conductor or due to cumulative incremental phase shifts between the phases of the frequency components $f_1$, $f_2$.

To overcome this potential ambiguity when detecting the test signal along the target conductor the phase difference between the frequency components $f_1$, $f_2$ is compared to a reference phase difference at a reference point where the initial phase offset is known. As the measured phase difference between $f_1$, $f_2$ increases, the reference phase difference is reset so that the phase creepage is tracked. This technique is known as Current Direction Reset.

Figure 6:
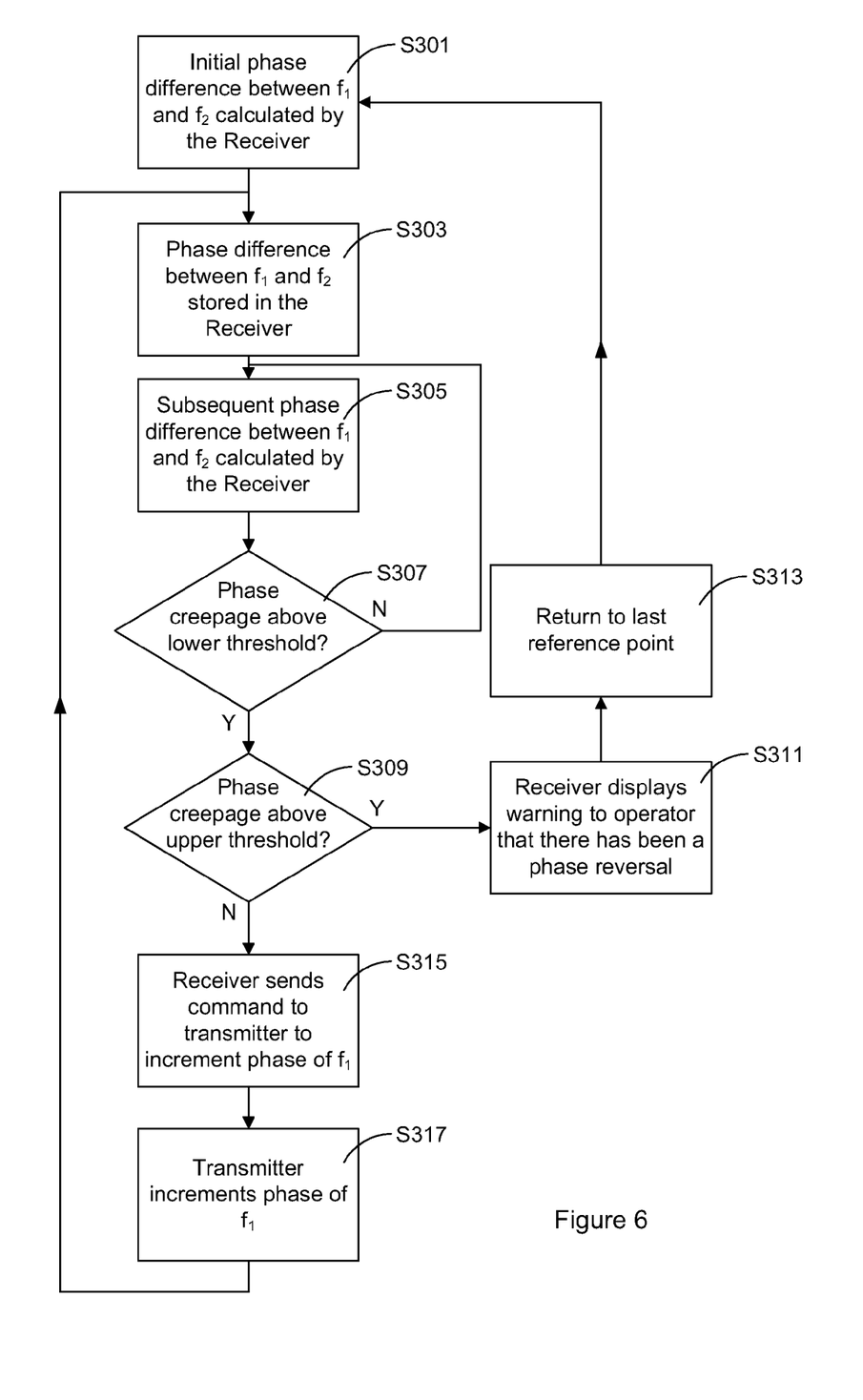
FIG. 6 is a flow chart of a method of resetting a phase difference between different frequency components of the test signal produced by the transmitter using the system of FIG. 1 in an embodiment of the invention.

In an embodiment of the invention the system 1 of FIG. 1 is configured to reset the current direction measurement according to the method shown in FIG. 6. In step S301 the initial phase difference between $f_1$ and $f_2$ is calculated by the receiver 7 at a location close enough to the transmitter 5 where a phase reversal due to creepage will not have occurred. In step S303 the phase difference between $f_1$ and $f_2$ at the reference location calculated by the receiver 7 is stored in the memory 39 of the receiver 7.

The receiver 7 is moved along the buried conductor 3 and at step S305 a subsequent phase difference between $f_1$ and $f_2$ is calculated and the phase creepage between the reference location and the current location is calculated. At step S307 if the phase creepage is below a lower threshold value then no action is taken and the receiver 7 is moved further along the buried conductor 3 and further phase measurements are made, returning to step S303. The lower threshold is 5°, preferably between 3° and 5° and further preferably 2°.

At step S307 if the phase creepage is above the lower threshold then in step S309 it is determined if the phase creepage is above an upper threshold. If the phase creepage is determined to be above an upper threshold then at step S311 the receiver determines that receiver is detecting a conductor onto which the test signal has 'jumped' from the target conductor or that the operator has strayed too far from the reference location such that there may have been a large phase creepage. The receiver conveys a warning to the operator that there has been a phase reversal. At step S313 the operator must return to the most recent reference location where it was known that the test signal had not jumped onto a second conductor and recommence detection from there. The magnitude of the upper threshold is 60°, preferably 80° and further preferably 88°.

If the phase creepage is between the upper and lower thresholds then at step S315 the receiver sends the "Increment CD F1 Phase" command listed in Table 1 to the transmitter to increment the phase of $f_1$, thereby reducing the phase difference between $f_1$ and $f_2$. In step S317 the transmitter 5 increments the phase of $f_1$ and the phase difference between $f_1$ and $f_2$ at this new reference location is stored in the receiver 7 at step S303. The transmitter 5 sends an "Increment CD F1 Phase" acknowledgement to the receiver 7.

Various modifications will be apparent to those in the art and it is desired to include all such modifications as fall within the scope of the accompanying claims.

Aspects of the present invention can be implemented in any convenient form, for example using dedicated hardware, or a mixture of dedicated hardware and software. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

I claim:

1. A system for detecting a buried conductor, the system comprising:
   means for producing an alternating test current in said buried conductor, the test current comprising a first component and a second component having a frequency different to a frequency of the first component;
   means for detecting an electromagnetic field produced by the test current in said buried conductor and for measuring a phase difference between the first component and the second component; and
   means for providing a communication link between the means for detecting an electromagnetic field and the means for producing an alternating test current;
   wherein the means for producing an alternating test current and means for detecting an electromagnetic field are configured for the means for detecting an electromagnetic field to alter, via the communication link, the phase difference between the first component and the second component.

2. A system as claimed in claim 1, wherein the means for producing an alternating test current and the means for detecting an electromagnetic field are configured for the means for detecting an electromagnetic field to alter the phase difference between the first component and the second component by:
   the means for detecting an electromagnetic field being configured to compare the phase difference at the means for detecting an electromagnetic field between the first component and the second component to a reference phase difference and to calculate a phase creepage;
   the means for detecting an electromagnetic field being configured to transmit a command to the means for producing an alternating test current to alter the phase difference between the first component and second component when the phase creepage is above a lower threshold and below an upper threshold; and
   the means for producing an alternating test current being configured to receive the command transmitted from the means for detecting an electromagnetic field and to alter the phase difference between the first component and the second component.

3. A system as claimed in claim 2, wherein the means for detecting an electromagnetic field comprises a user interface and the means for detecting an electromagnetic field is configured to convey a warning when the phase creepage is above the upper threshold.

4. A system as claimed in claim 3, wherein the warning comprises a warning that the phase of one of the first component and the second component is reversed.

5. A system as claimed in claim 3, wherein the warning comprises a warning that the electromagnetic field detected by the means for detecting an electromagnetic field is not produced by the test current in said buried conductor.

6. A system as claimed in claim 2, wherein the lower threshold is 2 degrees.

7. A system as claimed in claim 2, wherein the upper threshold is 88 degrees.

8. A system as claimed in claim 2, wherein the reference phase difference is measured at a location along said buried conductor.

9. A system as claimed in claim 1, wherein the communication link between the means for detecting an electromagnetic field and means for producing an alternating test current is provided by a transceiver at each of the means for producing an alternating test current and means for detecting an electromagnetic field.

10. A system as claimed in claim 1, wherein the communication link between the means for detecting an electromagnetic field and the means for producing an alternating test current is a duplex or half-duplex communication link.

11. A system as claimed in claim 1, wherein the communication link between the means for producing an alternating test current and the means for detecting an electromagnetic field is a wireless communication link.

12. A system as claimed in claim 1, wherein the means for detecting an electromagnetic field is configured to alter the phase difference between the first component and the second component without intervention from an operator of the system.

13. A system as claimed in claim 1, wherein the test current in said buried conductor is produced by the means for producing an alternating test current by means of an output module, the output module either radiating an electromagnetic field to induce the test current in said buried conductor, being directly connected to a part of said buried conductor or clamping the output module around said buried conductor.

14. A system as claimed in claim 1, further comprising:
analogue to digital converters to convert the field strength signals into digital signals; and
a digital signal processor arranged to process the digital signals and to isolate signals of predetermined frequency bands,
wherein the means for detecting an electromagnetic field includes a plurality of antennas for detecting the electromagnetic field produced by the test current in said buried conductor, and
wherein each antenna outputs a field strength signal representative of the electromagnetic field at the antenna.

15. A method of detecting a buried conductor, the method comprising:
providing a transmitter for producing an alternating test current in said buried conductor, the test current comprising a first component and a second component having a frequency different to a frequency of the first component;
providing a receiver for detecting an electromagnetic field produced by the test current in said buried conductor and for measuring a phase difference at the receiver between the first component and the second component;
providing a communication link between the receiver and the transmitter; and
the receiver altering, via the communication link between the receiver and the transmitter, the phase difference between the first component and the second component.

16. A method as claimed in claim 15, wherein the receiver alters the phase difference between the first component and the second component by:
comparing the phase difference at the receiver between the first component and the second component to a reference phase difference to calculate a phase creepage;
comparing the phase creepage to a lower threshold and an upper threshold;
transmitting a command from the receiver to the transmitter to alter the phase difference between the first component and second component when the phase creepage is above the lower threshold and below the upper threshold; and
altering the phase difference at the transmitter between the first component and the second component.

17. A method as claimed in claim 16, wherein the lower threshold is 5 degrees.

18. A method as claimed in claim 16, wherein the upper threshold is 60 degrees.

19. A method as claimed in claim 15, wherein the communication link between the receiver and transmitter is a duplex or half-duplex communication link and the communication link between the transmitter and receiver is a wireless communication link.

20. A method as claimed in claim 15, wherein the receiver is configured to alter the phase difference between the first component and the second component without intervention from an operator of the system.

21. A method as claimed in claim 15, wherein the test current in said buried conductor is produced by the transmitter by means of an output module, the output module either radiating an electromagnetic field to induce the test current in said buried conductor, being directly connected to a part of said buried conductor or clamping the output module around said buried conductor.

22. A method as claimed in claim 15, further comprising:
analogue to digital converters to convert the field strength signals into digital signals; and
a digital signal processor arranged to process the digital signals and to isolate signals of predetermined frequency bands.
wherein the receiver includes a plurality of antennas for detecting the electromagnetic field produced by the test current in said buried conductor, and
wherein each antenna outputs a field strength signal representative of the electromagnetic field at the antenna.

23. A system for detecting a buried conductor, the system comprising:
a transmitter for producing an alternating test current in said buried conductor, the test current comprising a first component and a second component having a frequency different to a frequency of the first component;
a receiver for detecting an electromagnetic field produced by the test current in said buried conductor and for measuring a phase difference at the receiver between the first component and the second component; and
means for providing a communication link between the receiver and the transmitter;
wherein the transmitter and receiver are configured for the receiver to alter, via the communication link between the receiver and the transmitter, the phase difference between the first component and the second component.

* * * * *